United States Patent [19]

McCann et al.

[11] Patent Number: 5,506,483
[45] Date of Patent: Apr. 9, 1996

[54] WINDSHIELD WIPER SYSTEM INCORPORATING A VARIABLE SPEED DC MOTOR

[75] Inventors: Roy A. McCann; John R. Suriano, both of Kettering; William C. Staker, Springfield, all of Ohio

[73] Assignee: ITT Automotive Electrical Systems, Inc., Auburn Hills, Mich.

[21] Appl. No.: 333,822

[22] Filed: Nov. 3, 1994

[51] Int. Cl.⁶ .................................................. B60S 1/08
[52] U.S. Cl. .................................. 318/444; 318/DIG. 2; 318/443
[58] Field of Search .................................. 318/260–283, 318/440–469, DIG. 2, 484; 15/250 C, 250.16, 250.17, 250.27, 250.13, 250.12

[56] References Cited

U.S. PATENT DOCUMENTS

| | | | |
|---|---|---|---|
| 4,578,591 | 3/1986 | Floyd et al. | 307/10 R |
| 4,585,980 | 4/1986 | Gille et al. | 318/444 |
| 4,663,575 | 5/1987 | Juzswik et al. | 318/444 |
| 4,665,488 | 5/1987 | Graham et al. | 318/444 |
| 4,705,997 | 11/1987 | Juzswik | 318/443 |
| 4,705,998 | 11/1987 | Millerd et al. | 318/444 |
| 4,916,374 | 4/1990 | Schierbeek et al. | 318/483 |
| 4,956,591 | 9/1990 | Schierbeek et al. | 318/483 |
| 5,059,877 | 10/1991 | Teder | 318/444 |
| 5,117,168 | 5/1992 | Nomura et al. | 318/444 |
| 5,140,233 | 8/1992 | Wallrafen | 318/264 |
| 5,140,234 | 8/1992 | Wallrafen | 318/264 |
| 5,157,312 | 10/1992 | Wallrafen | 318/264 |
| 5,216,341 | 6/1993 | Nomura et al. | 318/444 |
| 5,254,916 | 10/1993 | Hopkins | 318/443 |
| 5,386,111 | 1/1995 | Zimmerman | 318/444 |
| 5,397,991 | 3/1995 | Rogers | 324/434 |
| 5,404,085 | 4/1995 | Resch et al. | 318/443 |

*Primary Examiner*—Paul Ip
*Attorney, Agent, or Firm*—Dykema Gossett

[57] ABSTRACT

A windshield wiper control system improves vehicle windshield wiper operation by selectively controlling the motor speed of a dc motor that drives the wiper blade across the windshield. The motor speed is reduced for a portion of the wiper pattern adjacent the reversal points at each end of the wiper pattern. The motor speed is changed as a function of blade position by varying the duty cycle of an excitation voltage signal provided to a variable speed dc motor. The disclosed embodiment is useful for variable and continuous speed control in a vehicle wiper system.

19 Claims, 1 Drawing Sheet

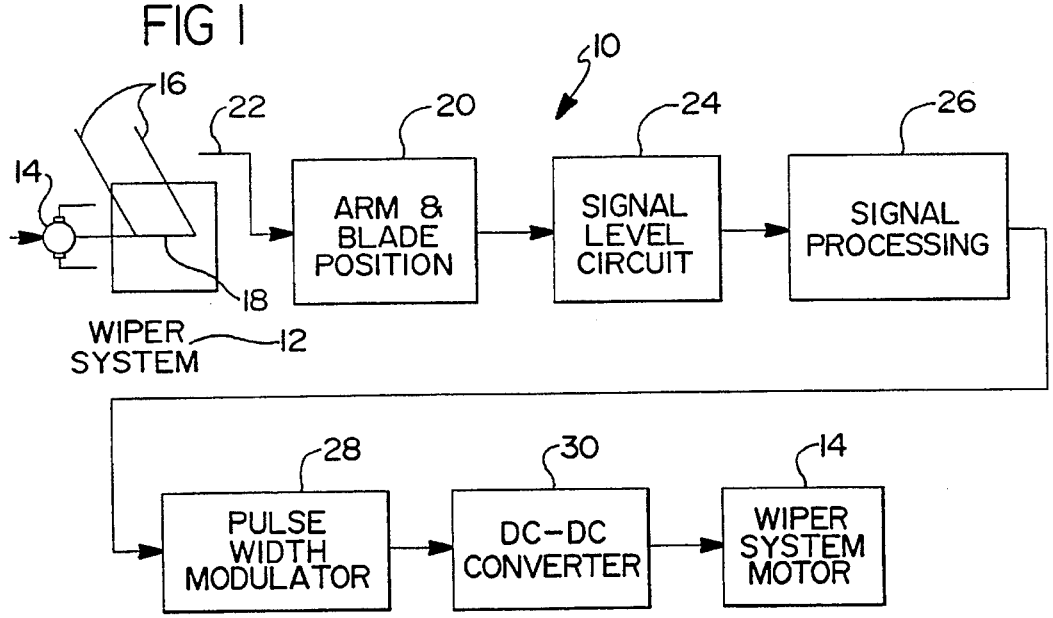
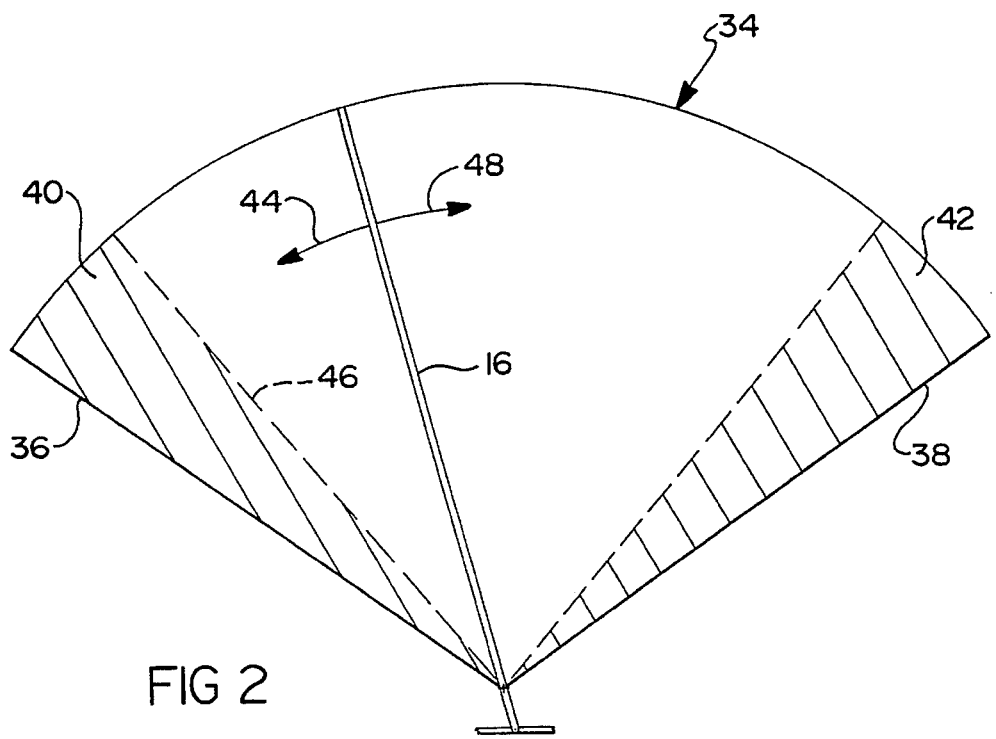

WINDSHIELD WIPER SYSTEM INCORPORATING A VARIABLE SPEED DC MOTOR

BACKGROUND OF THE INVENTION

Conventional vehicle windshield wiper systems include wipers that move in an arcuate sweeping motion across the windshield in order to remove unwanted water from the windshield. The typical wipe pattern of a windshield wiper is a semicircular arc. The wiper begins at one end of the arc, travels across the windshield to the opposite end of the arc and reverses direction at that point and returns to the initial position. Such motion necessarily includes an acceleration of the windshield wiper from one end of the arc to the other end. The ends of the arc are commonly referred to as the reversal points of the wiper pattern.

Various shortcomings and drawbacks are associated with conventional windshield wiper systems. For example, the acceleration of the blade to the reversal point followed by an abrupt stop at the reversal point often produces undesirable noise. Further, the acceleration of the wiper up to the reversal point can result in wipe pattern growth or the deformation of a preselected wipe pattern due to wear on the components of the wiper system caused by the acceleration and abrupt stopping of the wiper at the reversal points. Further, at high wiper speeds, the amount of lateral expulsion of water from the vehicle can be increased to an undesirable amount.

These drawbacks are associated with windshield wiper systems that include a tandem symmetrical overlapping windshield wiper pattern or those that have a single extending arm with a single wiper blade.

This invention provides a windshield wiper system that overcomes the shortcomings and drawbacks discussed above. This invention reduces the effects that are typically considered undesirable by slowing the motor speed for a preselected portion of the wipe pattern just prior to the reversal points. This invention preferably includes a variable speed dc motor wherein the motor speed is changed as a function of wiper blade position relative to the reversal points of the wipe pattern.

SUMMARY OF THE INVENTION

In most general terms, this invention provides a device for controlling the speed of a wiper in a vehicle windshield wiper system. The device includes a position indicator for indicating a position of the wiper relative to an end of a stroke across the windshield. A signal generator is coupled to the position indicator for generating a voltage signal that indicates the position of the wiper. A signal processor processes the position indicating signal to thereby produce a motor control signal that is proportional to the desired motor speed. In the preferred embodiment, a motor control signal has a constant frequency and a variable duty cycle. The duty cycle is varied as a function of the position of the wiper on the windshield relative to the reversal points of the wiper pattern.

This invention also provides a methodology for controlling the speed of a wiper in a vehicle windshield wiper system that includes a dc motor for moving the wiper throughout the wiper stroke along the surface of the windshield. The preferred methodology associated with this invention includes four basic steps. First, the location of the wiper relative to the reversal point or end of the wiper stroke is determined. Second, the portion of the wiper stroke adjacent the end of the stroke is determined wherein the wiper speed is preferably reduced relative to the remainder of the stroke. A wiper slow down condition is defined as the condition when the location of the wiper relative to the end is within the portion of the wiper stroke defined in the second step. Lastly, the duty cycle of a motor speed control signal that is supplied to the dc motor is varied when the wiper slow down condition from the third step is met in order to control the movement of the armature and speed of the wiper such that the wiper is slowed down prior to reaching a reversal point of the wiper stroke. Further advantages and objects of this invention will become apparent to those skilled in the art from the following detailed description of the preferred embodiments.

BRIEF DESCRIPTION OF THE DRAWINGS

FIG. 1 is a block diagram illustration of selected components of the inventive windshield wiper control system.

FIG. 2 is a diagrammatic representation of a windshield wiper pattern.

DETAILED DESCRIPTION OF THE PREFERRED EMBODIMENTS

FIG. 1 illustrates selected components of a windshield wiper control system 10. The wiper system operative components are illustrated as portion 12 of FIG. 1. The wiper system, per se, includes a dc motor 14 that preferably has a variable motor speed responsive to a motor control signal supplied to the motor. Wiper blades 16 are coupled to and driven by motor 14 through conventional linkage 18. Linkage 18 preferably moves wiper blades 16 through the wiper pattern according to a motor control signal received in motor 14.

Arm and blade position indicator 20 includes a position sensing device used to determine the position of the wiper blade on the windshield relative to the reversal points of the wipe pattern. The position sensing device preferably includes a switch operating from a cam or plate, for example, or an optical encoder or magnetic pick-up device that is coupled through suitable electronics for producing an electrical signal indicative of the position of the wiper blade. In the preferred embodiment, the voltage of the electrical signal from the position sensing device is the controlling or important characteristic of the signal. A position indicative voltage signal is produced by the signal level circuit illustrated by a block diagram box 24.

The position indicative voltage signal is processed at signal processing circuitry 26 such that the signal becomes proportional to a desired motor speed, dependent on the position of the wiper blade relative to the reversal point or end point of the wiper stroke. The determination of the desired motor speed depends on whether the position of the wiper is within a slow down portion or zone of the wiper blade pattern wherein it is desirable for the wiper blade to decelerate prior to reaching the reversal points. The angles defining the optimum surface area covered by the slow down portion of the wiper pattern can be determined on a vehicle-by-vehicle basis. The angles at which reduced speed will optimize system performance with respect to noise, angle growth and water expulsion is to be determined for a particular vehicle wiper system by system analysis and experimentation that would be understood by one skilled in the art and, therefore need not be further described.

The signal processing that occurs at 26 preferably includes level shifting and filtering in order to smooth out the characteristics of the voltage signal received from the signal level circuit 24. Level shifting and filtering are used, for example to smooth out the effects of abrupt changes in motor speed that may occur as the wiper blade 16 moves through the wiper pattern.

The control signal produced by signal processing circuitry 26, which is preferably directly proportional to the desired motor speed, is processed by pulse width modulator 28 to thereby produce a signal having a constant frequency and a variable duty cycle. The duty cycle of the modulated signal produced by modulator 28 is preferably variable between 0 volts and a high state voltage that corresponds to maximum wiper speed operation. The high state voltage is preferably suitable for driving a power semiconductor device such as the gate of a MOSFET.

The pulse width modulated signal is then processed by dc—dc converter circuit 30. A conventional dc—dc converter circuit such as a two transistor half bridge or a four transistor H-bridge circuit works suitably in the preferred embodiment of this invention. dc—dc converter circuit 30 outputs a motor control signal that is preferably applied to the armature of a two brush dc motor. The armature voltage of motor 14 preferably tracks the motor speed control signal and, therefore, the motor speed tends to follow the armature voltage.

FIG. 2 illustrates, in diagrammatic form, wiper blade 16 in wiper pattern or stroke 34. Wiper pattern 34 includes a first end 36 and a second end 38. Ends 36 and 38 are the reversal points of the wiper pattern. The areas indicated at 40 and 42 are the slow down portions of the wiper pattern wherein the speed of wiper blade 16 is reduced prior to reaching a reversal point (36 or 38) of wiper pattern 34. For example, the illustrated position of wiper blade 16 corresponds to a condition of maximum acceleration as wiper blade 16 moves through wiper pattern 34 an the direction of arrow 44. Once blade 16 reaches the point indicated by broken line 46, the duty cycle of the motor speed control signal is varied such that the motor speed is reduced as blade 16 travels through slow down region 40. Investigations and experimentation reveal that a slow down zone corresponding to an arc angle of between 15 and 30 degrees is most preferable.

An example of a typical wipe cycle follows. As illustrated in FIG. 2, blade 16, moving in the direction of arrow 44, is at maximum speed in the illustrated position. Position sensing element 20 and signal level circuit 24 communicate the location of wiper blade 16 to the remainder of system 10. Motor 14 preferably decelerates wiper blade 16 at approximately 15 degrees prior to the full out wipe position, reversal point 36. The motor reaches minimum speed immediately adjacent reversal point 36. After reaching reversal point 36, wiper blade 16 begins to traverse through the wipe pattern according to direction arrow 48. Position sensing element 20 and signal level circuit 24 in combination with the other circuit elements illustrated in FIG. 1, command motor 14 to accelerate wiper blade 16 once wiper blade 16 has moved approximately five degrees away from reversal point 36 (i.e., after reversing at reversal point 36, and beginning the inwipe motion in the direction of arrow 44). The position of blade 16 illustrated in FIG. 2 corresponds to the blade approaching maximum speed when moving in the direction of arrow 48. A slow down process, similar to that described above, occurs once blade 16 enters slow down zone 42 approaching reversal point 38.

As can be seen by the above description, this invention provides a useful system and methodology for controlling the speed of a windshield wiper as a function of the position of the wiper relative to the reversal points of the wipe pattern. Further modifications are possible such as changing the size of the slow down zones as a function of wiper speed. Other possible embodiments include selectively varying the speed of the wiper throughout its stroke. The above description is exemplary rather than limiting in nature. The scope and purview of this invention shall be limited only by the appended claims.

We claim:

1. A device for controlling the speed of a wiper in a vehicle windshield wiper system, comprising:

a position indicator for indicating a position of the wiper relative to an end of a stroke across the windshield;

a signal generator, coupled to said position indicator, for generating a signal indicative of the position of the wiper; and a signal processor for processing the position indicative signal to thereby produce a motor control signal that is proportional to a desired motor speed, said motor control signal having a constant frequency and being variable as a function of said position of the wiper such that said motor speed is altered as the wiper approaches said end of said stroke.

2. The device of claim 1, wherein said position indicator comprises a moving member that moves in unison with the wiper and a switch, coupled to said moving member, that is actuated as a function of the position of said moving member to thereby indicate the position of the wiper.

3. The device of claim 1, wherein said position indicator comprises a moving member that moves in unison with the wiper and an optical encoder coupled to said moving member such that said optical encoder determines the position of the wiper using the position of the moving member.

4. The device of claim 1, wherein said signal processor comprises a filter for filtering out abrupt changes in said position indicative signal.

5. The device of claim 1, wherein said signal processor comprises a pulse width modulator for generating a signal having a constant frequency and a selectively variable duty cycle, said duty cycle being variable between a value equal to zero volts and a maximum state voltage that corresponds to a maximum wiper speed.

6. The device of claim 5, wherein said signal processor further comprises a dc—dc converter coupled to said pulse width modulator for producing the motor speed control signal in a form that is interpreted by a motor that moves the wiper across the windshield.

7. A method for controlling the speed of a wiper in a vehicle windshield wiper system that includes a dc motor for moving the wiper throughout a wiper stroke along the surface of the windshield, comprising the steps of:

(A) determining the location of the wiper relative to an end of the wiper stroke;

(B) defining a portion of the wiper stroke adjacent the end of the wiper stroke wherein the wiper speed is reduced relative to the remainder of the stroke by determining a first relationship between an average wiper Speed and the total travel of the wiper through the stroke, determining a second relationship between an average wiper speed and a desired amount of lateral water expulsion from the windshield, and calculating an amount of wiper stroke that corresponds to preselected amounts of water expulsion while permitting wiper slow down as the wiper approaches the end of the stroke, using said first and second relationships;

(C) defining a wiper slow down condition when the location from step (A) is within the portion from step (B); and (D) varying a duty cycle of a motor speed control signal that is supplied to the dc motor when the condition in step (C) is met to thereby control the speed of the wiper.

8. The method of claim 7, wherein step (D) is performed by the substeps of generating a motor speed control signal that is proportional to a desired motor speed and modulating the motor speed control signal, using pulse width modulation, to thereby generate a control signal having a constant frequency and a selectively variable duty cycle.

9. The method of claim 8, wherein the duty cycle of the control signal is used to directly control the speed of the wiper.

10. The method of claim 7, wherein step (A) is performed by the substeps of generating a position signal that has a voltage indicative of the position of the wiper relative to the end of the wiper stroke.

11. The method of claim 10, wherein step (D) is performed by the substeps of processing the position signal to thereby produce a motor control signal proportional to a desired motor speed.

12. The method of claim 11 wherein step (D) is performed by the further substeps of modulating the motor control signal, using pulse width modulation, to thereby generate a motor speed signal having a constant frequency and a selectively variable duty cycle.

13. A method for controlling the speed of a wiper in a vehicle windshield wiper system that includes a dc motor for moving the wiper throughout a wiper stroke along the surface of the windshield, comprising the steps of:

(A) determining the location of the wiper relative to an end of the wiper stroke;

(B) defining a portion of the wiper stroke adjacent the end of the wiper stroke wherein the wiper speed is reduced relative to the remainder of the stroke by determining a first relationship between an average wiper speed and the total travel of the wiper through the stroke, determining a second relationship between an average wiper speed and noise caused by the wiper reaching an end of the stroke, and calculating an amount of the wiper stroke that corresponds to reducing noise caused by the wiper reaching the end of the stroke, using the first and second relationships;

(C) defining a wiper slow down condition when the location from step (A) is within the portion from step (B); and (D) varying a duty cycle of a motor speed control signal that is supplied to the dc motor when the condition in step (C) is met to thereby control the speed of the wiper.

14. The method of claim 13, wherein step (D) is preformed by the substeps of generating a motor speed control signal that is proportional to a desired motor speed and modulating the motor speed control signal, using pulse width modulation, to thereby generate a control signal having a constant frequency and a selectively variable duty cycle.

15. The method of claim 14, wherein the duty cycle of the control signal is used to directly control the speed of the wiper.

16. The method of claim 13, wherein step (A) is performed by the substeps of generating a position signal that has a voltage indicative of the position of the wiper relative to the end of the wiper stroke.

17. The method of claim 16, wherein step (D) is performed by the substeps of processing the position signal to thereby produce a motor control signal proportional to a desired motor speed.

18. The method of claim 17, wherein step (D) is performed by the further substeps of modulating the motor control signal, using pulse width modulation, to thereby generate a motor speed signal having a constant frequency and a selectively variable duty cycle.

19. A method for controlling the speed of a wiper in a vehicle windshield wiper system that includes a dc motor for moving the wiper throughout a wiper stroke along the surface of the windshield, comprising the steps of:

(A) determining the location of the wiper relative to an end of the wiper stroke;

(B) defining a portion of the wiper stroke adjacent the end of the wiper stroke wherein the wiper speed is reduced relative to the remainder of the stroke by determining a first relationship between an average wiper speed and the total travel of the wiper through the stroke, determining a second relationship between an average wiper speed and an undesirable amount of deformation of the wiper stroke, and calculating an amount of the wiper stroke that is required to compensate for the undesirable deformation, using the first and second relationships;

(C) defining a wiper slow down condition when the location from step (A) is within the portion from step (B); and (D) varying a duty cycle of a motor speed control signal that is supplied with a dc motor when the condition in (C) is met to thereby control the speed of the wiper.

* * * * *

UNITED STATES PATENT AND TRADEMARK OFFICE
CERTIFICATE OF CORRECTION

PATENT NO. : 5,506,483
DATED      : April 9, 1996
INVENTOR(S) : McCann, et al

It is certified that error appears in the above-indentified patent and that said Letters Patent is hereby corrected as shown below:

Column 4, line 58, please delete uppercase "S" and substitute lowercase "s" in the word "Speed".

Signed and Sealed this

Second Day of July, 1996

Attest:

BRUCE LEHMAN

Attesting Officer          Commissioner of Patents and Trademarks